United States Patent [19]
Sato et al.

[11] Patent Number: 5,801,884
[45] Date of Patent: Sep. 1, 1998

[54] OPTICAL DEVICE AND PROCESS FOR PRODUCING THE SAME

[75] Inventors: Heihachi Sato, Yokosuka; Seiichiro Hayakawa; Iwao Seo, both of Ibaraki-ken, all of Japan

[73] Assignee: Mitsubishi Chemical Corporation, Tokyo, Japan

[21] Appl. No.: 727,087

[22] Filed: Oct. 8, 1996

[30] Foreign Application Priority Data

Oct. 9, 1995 [JP] Japan ................................. 7-261381
Nov. 28, 1995 [JP] Japan ................................. 7-309220

[51] Int. Cl.$^6$ ................................. G02B 27/10
[52] U.S. Cl. ................................. 359/620
[58] Field of Search ................................. 359/619, 620, 359/900; 349/10

[56] References Cited

U.S. PATENT DOCUMENTS

| | | | |
|---|---|---|---|
| 4,414,316 | 11/1983 | Conley | 430/496 |
| 4,420,527 | 12/1983 | Conley | 428/172 |
| 4,986,633 | 1/1991 | Ohta | 359/900 |
| 5,225,935 | 7/1993 | Watanabe et al. | 359/619 |
| 5,239,412 | 8/1993 | Naka et al. | 359/620 |
| 5,442,482 | 8/1995 | Johnson et al. | 359/619 |
| 5,604,635 | 2/1997 | Lawandy | 359/620 |

OTHER PUBLICATIONS

Rapid Communications, In: Applied Optics, vol. 30, No. 19 1 Jul. 1991, S.2666, 2667.
Patents Abstracts of Japan 1–80901 A., p. 897, Jul. 13, 1989, vol. 13, No. 306
Patents Abstracts of Japan 57–212402 A., p. 184, Mar. 19, 1983, vol. 7, No. 67.

*Primary Examiner*—Georgia Y. Epps
*Assistant Examiner*—Ricky Mack
*Attorney, Agent, or Firm*—David G. Conlin; George W. Neuner

[57] ABSTRACT

An optical device is useful as a microlens array or a grating lens, which comprises microlens portions each having a light transmittance of not less than 80% within a visible light range, and produced by subjecting a photo-curable monomer composition to two-stage light-irradiation comprising a partial irradiation and a whole irradiation.

19 Claims, 4 Drawing Sheets

OPTICAL DEVICE AND PROCESS FOR PRODUCING THE SAME

BACKGROUND OF THE INVENTION:

The present invention relates to an optical device and a process for producing the same, and more particularly to an optical device such as a microlens array or a grating lens for use in an optical communication system, an optical circuit, a liquid crystal display panel, a copying machine or the like.

Hitherto, there have been many proposals concerning a process for producing an optical device such as a microlens array and a grating lens which is made from either a glass material or a plastic material and a process for producing the same.

As regards the production of the glass lens, there have been proposed (i) a method in which the glass material is molded in a metal mold, (ii) a method in which a photo-sensitive glass material is irradiated with light so that a convex lens is produced by utilizing a shrinking effect of the glass material, or (iii) a method in which a graded-index lens is produced by selectively diffusing ions of Ag, Pd, Li or the like in the glass material. However, in these methods, there are problems such as low productivity and high manufacturing cost or the like. In addition, since the specific gravity of the glass material is about 2 to 3 times that of a plastic material, the glass material is not applicable to the fields in which the use of light-weight materials is required.

On the other hand, in connection with the production of the plastic lens, many methods have been reported but all of the methods show the disadvantages as follows.

(1) Molding method using a metal mold: It is difficult to produce a lens having a size of not more than 1 mm.

(2) Photolithographic method in which a thermoplastic resin film is subjected to a pattern formation by a known photolithographic method and thereafter the obtained pattern is heated to a temperature not lower than a softening point thereof so that the sagging is caused at an edge portion of the pattern, resulting in production of a convex lens: It is impossible to produce a concave lens.

(3) Proximity-exposure method in which a photosensitive film is subjected to a proximity-exposure, wherein the amount of a photo-reactive material to be distributed in the photosensitive film is varied depending upon a degree of gloom occurring at an edge portion of the resulting pattern, thereby producing a convex lens: It is difficult to control an optical performance of the product.

(4) Index-grading method in which a photosensitive resin film is irradiated with light having a graded intensity, so that the refractive index profile is caused on the film in response to the intensity of light irradiated, whereby the film with a lens effect can be attained: The product shows a low numerical aperture.

(5) Selective ion-diffusion method by which a graded-index lens can be produced: It is difficult to control an optical performance of the product.

Furthermore, Japanese Patent Application Laid-Open (Kokai) Nos. 6-160608 (1994) and 6-208008 (1994) disclose a method in which a photo-curable monomer composition dissolving a polymer therein is subjected to two-stage exposure including a masked partial exposure and a whole exposure to produce a microlens array comprising a polymethyl methacrylate-based plastic material and having a translucent portion thereon. However, each of the microlenses array produced by the above method has a low light-transmittance of 50 to 60% and further, in the method, there is a problem that a parallel light must be used to carry out the polymerization and curing of the photo-curable monomer composition.

As a result of the present inventors' earnest studies for solving the afore-mentioned problems, it has been found that by using a photo-curable monomer composition containing substantially no polymer as a raw material and subjecting the photo-curable monomer composition to smooth shrinkage by polymerization, concave or convex portions can be formed at a high dimensional accuracy on a surface of the polymer without suffering from optical strain, wherein the light-transmittance of the produced microlens portions is not less than 80% in a visible light range. The present invention has been attained by the finding.

SUMMARY OF THE INVENTION

It is an object of the present invention to provide an optical device such as a microlens array or a grating lens, which shows a light weight, excellent molding properties in which a lens having a size of not more than 100 μm can be readily produced in the form of either a convex lens or a concave lens, a wide selectable range and easy-controllability of its optical properties, a high productivity and a high light-transmittance.

To accomplish the aim, in a first aspect of the present invention, there is provided an optical device comprising microlens portions each having a light transmittance of not less than 80% within a visible light range, and produced by subjecting a photo-curable monomer composition to two-stage light-irradiation comprising a partial irradiation step by means of a mask and a whole irradiation step.

In a second aspect of the present invention, there is provided an optical device comprising microlens portions and non-microlens portions both of which are made of resin, each of microlens portions having a light transmittance of not less than 80% within a visible light range.

In a third aspect of the present invention, there is provided a process for producing an optical device comprising microlens portions, which comprising pouring a photo-curable monomer composition into a mold and subjecting the photo-curable monomer composition to two-stage light-irradiation comprising a partial irradiation and a whole irradiation to form microlens portions each having a light transmittance of not less than 80% within a visible light range.

In a fourth aspect of the present invention, there is provided a color filter comprising an optical device comprising microlens portions each having a light transmittance of not less than 80% within a visible light range, and produced by subjecting a photo-curable monomer composition to two-stage light-irradiation comprising a partial irradiation step by means of a mask and a whole irradiation step.

DETAILED DESCRIPTION OF THE INVENTION

Figure 1:
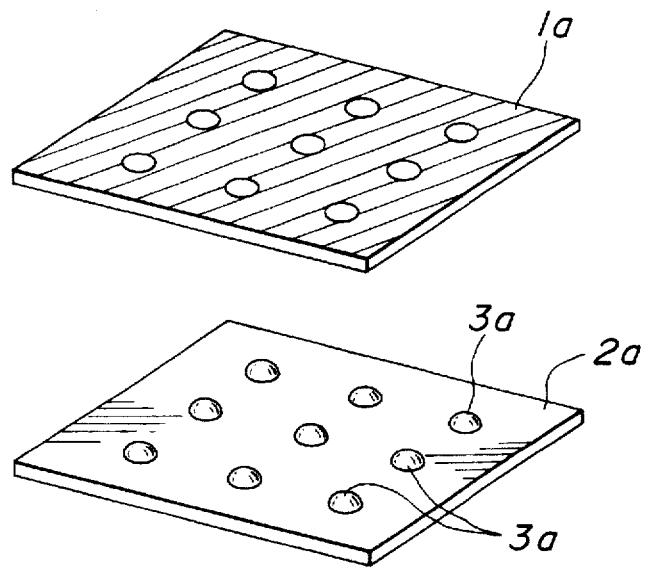
FIG. 1 is a perspective view showing a convex microlens array according to one preferred embodiment of the present invention.

The photo-curable monomers used in the present invention are generally classified into the following three groups:

1) Radical polymerization-type monomers such as acrylate- or methacrylate-based compounds;
2) Addition polymerization-type monomers such as polyene- polythiol-based compounds; and
3) Cationic polymerization-type monomers such as epoxy-based compounds, vinyl ether-based compounds or cyclic ether-based compounds.

These monomers have a shrinkage by polymerization of several to several tens %, except for compounds which belong to the cationic polymerization-type monomers and causes a volume expansion due to a ring opening thereof when subjected to polymerization and curing.

Generally, upon forming a polymer molded product, the shrinkage by polymerization causes inconveniences such as separation from a mold surface, deteriorated surface roughness, increase of an optical strain or the like. However, contrary to the conventional knowledges, it has been found that by causing the shrinkage by polymerization to proceed smoothly, concave or convex portions can be formed on a surface of the polymer molded product with a high dimensional accuracy, and that if the shrinkage by polymerization is not forcibly suppressed and caused to proceed spontaneously, no optical strain is caused in the polymer molded product.

The photo-curable monomers used in the present invention may be any compounds which are capable of being polymerized and cured by irradiation of light to form a transparent polymer, and therefore not limited to particular ones. For Example, the compounds belonging to the afore-mentioned three groups are usable. Among them, acrylate compounds or methacrylate compounds are suitable.

Specific examples of the preferred acrylate or methacrylate compounds may include multi-functional acrylate or methacrylate compounds having a plurality of acryloyl or methacryloyl groups, such as triethylene glycol-diacrylate, triethylene glycol-dimethacrylate, hexane diol-acrylate, hexane diol-methacrylate, 2,2-bis(4-acryloyl-oxy-phenyl) propane, 2,2-bis(4-methacryloyl-oxy-phenyl)propane, 2,2-bis[4-(2-acryloyl-oxy-ethoxy)phenyl]propane, 2,2-bis[4-(2-methacryloyl-oxy-ethoxy)phenyl]propane, p-bis(β-acryloyl-oxy-ethylthio)xylene, p-bis(β-methacryloyl-oxy-ethylthio)xylene, 4,4'-bis(β-acryloyl-oxy-ethylthio)diphenyl sulfone, 4,4'-bis(β-methacryloyl-oxy-ethylthio)diphenyl sulfone, trimethylol propane-triacrylate, trimethylol propane-trimethacrylate, urethane acrylate and epoxy acrylate, a mixture of any of these multi-functional acrylate or methacrylate compounds and a monofunctional monomer copolymerizable therewith, and a mixture of any of these multi-functional acrylate or methacrylate compounds and polythiol capable of addition-polymerization therewith, or the like. Among these compounds, the multi-functional acrylate or methacrylate monomers are more preferred.

The monofunctional monomers copolymerizable with the multi-functional acrylate or methacrylate compound may include, for example, methyl acrylate, methyl methacrylate, benzyl acrylate, benzyl methacrylate or the like. The polythiols capable of addition-polymerization with the multi-functional acrylate or methacrylate compound may include, for example, pentaerythritol-tetrakis(β-thiopropionate), tris [2-(β-thiopropionyl-oxy)ethyl]isocyanurate or the like.

Especially preferred photo-curable monomers are those compounds capable of producing a polymer having a refractive index (relative to air) of not less than 1.50, preferably not less than 1.55, more preferably not less than 1.58.

Any known photo-polymerization initiator can be used in order to cure the photo-curable monomer. Examples of these photo-polymerization initiators may include 2,4,6-trimethylbenzoyl-diphenyl-phosphine oxide, trimethylbenzoylphenyl-phosphinic acid methyl ester, 1-hydroxy-cyclohexyl phenyl ketone, benzophenene, diphenoxy benzophenene or the like. These photo-polymerization initiators can be used singly or in the form of a mixture of any two or more thereof.

In the case where both photo-curing and heat-curing are used in combination to rapidly complete the curing of the photo-curable monomer, any known heat-polymerization initiators such as benzoyl peroxide, diisopropyl-peroxy carbonate, t-butyl peroxy(2-ethylhexanoate) or the like are usable.

Further, an anti-oxidant, an ultraviolet absorber, a colorant or the like can be added to the photo-curable monomer.

It is especially preferable to add a fluorescent dye, thereby causing the resulting lens to have an optical amplification.

Examples of organic fluorescent dyes usable for the production of the optical device according to the present invention may include the following compounds. Incidentally, in the following, the number in parentheses represents an "oscillation wavelength $\lambda_{max}$ (nm)" of the respective compounds, if any.

1. Polyphenyl-based compounds

PTP (450), BMT (334), TMQ (350), DMQ (360), BBQ (382), polyphenyl 1 (382), BPA (430)

2. Stilbene-based compounds

DPT, DPS (408), stilbene 1 (445), stilbene 3 (435), (Bis)MsB (420)

3. Oxazole- or Oxadiazole-based compounds

PBBO (395), PBD, butyl PBD, POPOP (420), dimethyl POPOP (430), BBO (410), PPO, α-NPO, α-NOPON,

BBOT

4. Coumarin-based compounds coumarin 4 (456), coumarin 311 (461), coumarin 1, coumarin 470 (460), DAMC, coumarin 120 (440), coumarin 175 (457), coumarin 151 (490), coumarin 152 (485), coumarin 500, coumarin 35 (481), coumarin 2 (450), coumarin 307 (503), coumarin 102 (480), coumarin 3147, coumarin 153 (540), coumarin 138 (468), coumarin 106 (478), coumarin 339 (450), coumarin 340 (513), coumarin 355 (522), coumarin 343 (519), coumarin 314 (504), coumarin 338 (495), coumarin 334 (521), coumarin 337 (523), coumarin 7 (523), coumarin 30 (515), coumarin 6 (540), carbostyryl 124 (422), carbostyryl 165 (425)

5. Xanthene-based compounds rhodamine 110 (560), rhodamine 116 (580), tetramethyl rhodamine, rhodamine B (610), rhodamine 123 (575), rhodamine 19 (585),
rhodamine 6G (590), sulfo-rhodamine B (620),
rhodamine 101 (640), sulfo-rhodamine 101 (640),
acridine red (580), acridine orange, safranine T,
pyronine G (600), pyronine B (605), rhodamine 6G tetrafluoroborate, rhodamine 6G perchlorate,
rhodamine 19 perchlorate, fluorescein, 2',7'-dichlorofluorescein, eosin Y, erythrosine B, phloxine B, rose bengal, naphthalo-fluorescein, carbazine 122 (720),
Victoria Blue R (814)
6. Oxazine- or thiazine-based compounds
oxazine 1 (715), oxazine 725 (715), oxazine 4 (694), cresyl violet (650), Nile Blue A (690), Nile Blue A perchlorate, oxazine 170 (710), oxazine 720 (710), thionin, Nile Red, oxazine 4 perchlorate, oxazine 170 perchlorate, oxazine 1 perchlorate
7. Polymethin-based (cyanine-based) compounds
DEOPC (660), DEOTC (780), D(M)OTC iodide, DTDC iodide
(760), DTTC iodide (860), DTTC perchlorate, HIDC iodide
(740), HITC iodide (850), HITC perchlorate, HDITC perchlorate, kryptocyanine, IR-125 (940), IR-144 (945), IR-140 (950), IR-132 (972), DNTPC 1100, DNXTPC 1107-1285,
DNDTPC 1080-1200, DCM (656), styryl 6 (730), styryl 9 (820), NDU-102
8. Others
pyridine-based compounds, dithiol Ni complex, naphthalimide-based compounds, phthalocyanine-based compounds, azo dyes such as methyl orange, methyl red or the like.

Among these fluorescent dyes, xanthene-based compounds and coumarin-based compounds are preferred because these compounds are excellent in dissolvability in the monomers and heat resistance. Especially preferred fluorescent dyes are rhodamine compounds.

A suitable amount of the fluorescent dye doped is varied depending upon kinds thereof by taking into account efficiencies of light amplification or conversion of wavelength. The amount of the fluorescent dye doped is in the range of 0.01 ppm to 10,000 ppm, preferably 0.1 ppm to 1,000 ppm, more preferably 1 ppm to 1,000 ppm. When the amount of the fluorescent dye doped is too small, the resulting optical device cannot exhibit sufficient efficiencies of light amplification or the like. On the other hand, when the amount of the fluorescent dye doped is too large, the resulting optical device not only exhibits an excessive absorptivity but also causes side effects such as thermal degradation, so that the optical device also suffers from deterioration in efficiency of the light amplification or the like.

The curing of the photo-curable monomer composition by irradiation of light may be conducted in such a manner that the composition is first shaped into, for example, a plate, and then the plate is in turn exposed to a partial irradiation and a whole irradiation.

For example, as shown in FIG. 1, a negative-type mask pattern 1a having a plurality of holes is disposed over a plate 2a made from a photo-curable monomer composition. When light is irradiated from above the negative-type mask pattern 1a, the irradiated light passes through the holes and can reach only lens-forming portions of the plate 2a, whereby the light-irradiated portions (lens-forming portions) 3a of the plate 2a are cured and transformed into a convex microlens so that a microlens array composed of convex lenses can be formed on the plate 3a.

Figure 2:
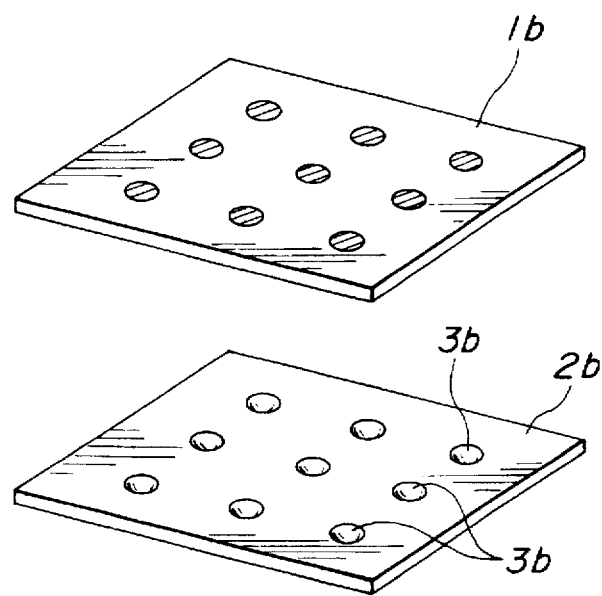
FIG. 2 is a perspective view showing a concave microlens array according to one preferred embodiment of the present invention.

Alternatively, as shown in FIG. 2, in the case where a positive-type mask pattern 1b having dot-like patterns is disposed over a plate 2b made from the photo-curable monomer composition and irradiated with light from the above, non-irradiated portions 3b of the plate 2b are each transformed into a concave microlens, so that a microlens array composed of concave lenses can be also formed on the plate 2b.

Figure 3:
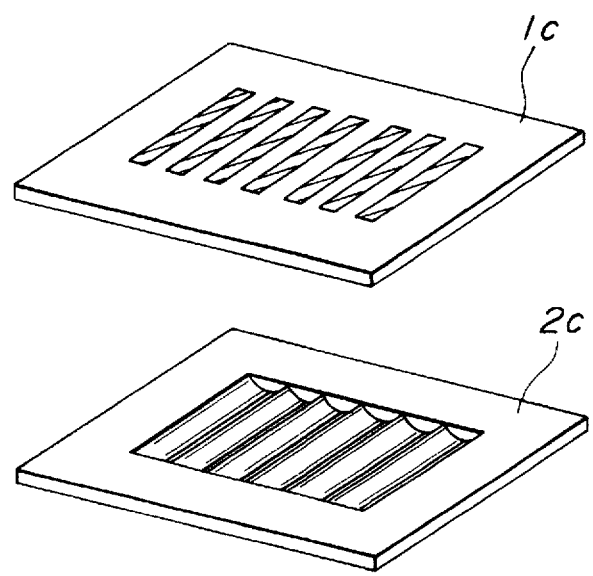
FIG. 3 is a perspective view showing a grating lens according to one preferred embodiment of the present invention.

Furthermore, as shown in FIG. 3, in the case where a parallel line pattern mask 1c having a predetermined pitch is used, a grating lens 2c can be formed.

The masks used in such a partial irradiation can be produced by appropriate methods such as a photographic method, a vapor deposition method, a printing method or the like. As a substrate of the mask on which patterns are formed, a glass plate is preferred. Also, a polymer or paper film or a laminated plate prepared by adhering such a film to a rigid transparent material such as the glass plate is applicable as the substrate. The pattern-formed mask surface can be so disposed as to face either the inside or the outside of the casting mold. In order to obtain a better transferring property of the patterns onto the photo-curable monomer composition, the patterns is preferably formed on the inside surface of the mask which is brought into contact with the photo-curable monomer composition. Further, the use of a mask prepared by vapor-depositing chromium on a glass plate is preferred under the consideration of the mask recyclability because the patterns formed by the vapor deposition of chromium is not corroded by the photo-curable monomer composition.

Light-irradiating source used in the present invention is appropriately selected depending upon characteristic wavelengths of the photo-curable monomer composition and the photo-polymerization initiator. In general, ultraviolet light sources such as a high-pressure discharge lamp, a metal-halide lamp or a short arc lamp are suitably used for emitting a parallel light, a scattered light or the like. By using a photosensitizer in combination, visible-light or infrared-ray sources such as a laser can be also used.

The shrinkage by polymerization of the photo-curable monomer composition proceeds in proportion to increase in degree of polymerization thereof by irradiation of light. Accordingly, for example, in the case where a convex microlens array is formed by using a negative-type mask, the plate of the photo-curable monomer composition is partially irradiated with light through the negative-type mask. In such a case, the amount of light irradiated on the plate of the photo-curable monomer composition is decreased from a center of the non-masked portion to a periphery thereof and further from the periphery to the masked portion on which slight light is diffracted. The non-masked portion undergoes the shrinkage by polymerization and caused to sink in the mold while being transformed into a convex portion. At this time, uncured photo-curable monomer composition is flowed from a periphery of the masked portion into the convex non-masked portion so that the photo-curable monomer composition in the mold is seen as a flat surface at the time when the partial irradiation (first irradiation) is completed. Successively, after removing the mask, the photo-curable monomer composition is then subjected to a whole irradiation of light (second irradiation), so that the photo-curable monomer composition which is uncured in the preceding first partial irradiation stage, is subjected to the shrinkage by polymerization so that a surface thereof is caused to sink in the mold. As a result, the convex portion having already cured is raised relative to the remainder, thereby forming a microlens as a final product. That is, the non-masked portion of the photo-curable monomer composition forms the convex projection. In case of the positive-type mask pattern or the line mask pattern, a concave-lens array or a grating lens is formed by the same mechanism, except that different patterns are used therefor.

If appropriate light-irradiating conditions are selected at the first partial irradiation, by controlling the amount of the irradiated light from the center of the non-masked portion to the periphery and the amount of the irradiated light diffracted to the masked portion, a spherical lens or non-spherical lens can be formed instead of the convex or concave lens. Further, in the case where the irradiation conditions are adjusted so as to suppress the aforementioned diffraction phenomenon, it becomes possible to produce a rectangular lens suitable as a grating lens.

The shape of the resulting lens can be varied depending upon the mask patterns. Also, by selecting an appropriate kind of the photo-curable monomer composition and/or blending two or more photo-curable monomer compositions with each other, the degree of shrinkage by polymerization and the refractive index thereof can be controlled properly, so that it becomes possible to produce a lens having a specific convex or concave shape, namely a lens having a lens diameter or a focal distance as required. Furthermore, when the irradiated light is incident on the surface of the mask not vertically but at an inclined angle relative thereto, various lenses which are oriented in various directions can be produced in the cured polymer.

If the mold which comes into contact with the surface of the photo-curable monomer composition opposite to the surface which contacts the mask, is prepared from a transparent material such as glass, light can be irradiated through an entire back surface of the mold to complete the curing of an entire part of the photo-curable monomer composition. Thus, by irradiating opposite surfaces of the photo-curable monomer composition in the mold, it becomes possible to simultaneously carry out the formation of convex or concave lens at one surface and the curing of the entire part of the photo-curable monomer composition at the other surface. Further, by disposing masks on the both surfaces of the photo-curable monomer composition and carrying out the light-irradiating and curing treatment, the convex lenses and/or concave lenses are formed on both the surfaces of the photo-curable monomer composition.

In accordance with the present invention, it is preferred that sequential steps of from the partial irradiation to the whole irradiation be carried out in a short time as rapidly as possible. The time required to complete the entire irradiation steps of from the partial irradiation to the whole irradiation is generally not more than 20 minutes, preferably not more than 10 minutes, more preferably not more than 3 minutes.

When the time required to complete the entire irradiation steps is too long, the curing is propagated to the non-irradiated portion, so that it becomes difficult to produce a lens having a required shape and optical properties, though good results might be obtained in some cases.

At the respective irradiation steps, in order to complete the curing of the photo-curable monomer composition as rapidly as possible, an entire part of the mold in which the photo-curable monomer composition has been incorporated can be heated, or a thermal polymerization initiator can be added to the photo-curable monomer composition to promote the curing.

However, when the photo-curable monomer composition is heated, the photo-curable monomer composition or the polymerizing material is maintained at not more than 150° C., preferably not more than 100° C., more preferably not more than 70° C.

If the photo-curable monomer composition is heated to an elevated temperature as high as more than 150° C., the resulting optical device is likely to show optical strain. If the fluorescent dye is incorporated in the monomer composition, there is a likelihood that the fluorescent dye is degraded in the polymerization of the monomer composition. Accordingly, it is preferred that the polymerization of the photo-curable monomer composition is carried out at a temperature as low as possible.

After completion of the curing, the optical device prepared according to the present invention may be somewhat subjected to heat-treatments such as annealing in order to reduce the optical strain thereof. Further, the optical device may be surface-treated in order to form optical coatings such as a hard coating and an anti-reflection coating, or to carry out the surface treatment of dying, selective ion diffusion or selective low-molecular diffusion.

The thus-prepared optical device according to the present invention can show a high light-transmittance due to uniform polymerization of the photo-curable monomer composition. Specifically, in the microlens portions of the optical device prepared according to the present invention, the light-transmittance in a visible light region may be not less than 80%, preferably not less than 85%. Accordingly, for example, by using an element prepared by laminating a liquid crystal panel or a color filter for a solid-state image sensing device over a microlens array according to the present invention, it becomes possible to merge the lights absorbed in a plaque matrix, which serves for shielding between red, green and blue pixels, into the respective pixels. In addition, a loss due to light absorption by the microlens array itself is limited to a minimum level so that an emission efficiency of the optical device can be considerably enhanced.

EXAMPLES

The present invention is described in more detail by way of examples. However, the examples are only illustrative and therefore the present invention is not limited to the examples.

Meanwhile, the focal distance appearing through the following examples and comparative examples, is a value measured by using a laser beam having a wavelength of 630 nm and a diameter of 1 mm at room temperature. In the case of the converging-type microlens, the focal distance is a positive value, while in the case of the diverging-type microlens, the focal distance is a negative value.

The light transmittance of the optical device was measured by a spectrophotometer with respect to light beams having a diameter of 1 mm and a wavelength of 450 nm, 550 nm and 650 nm.

Example 1

Figure 4:
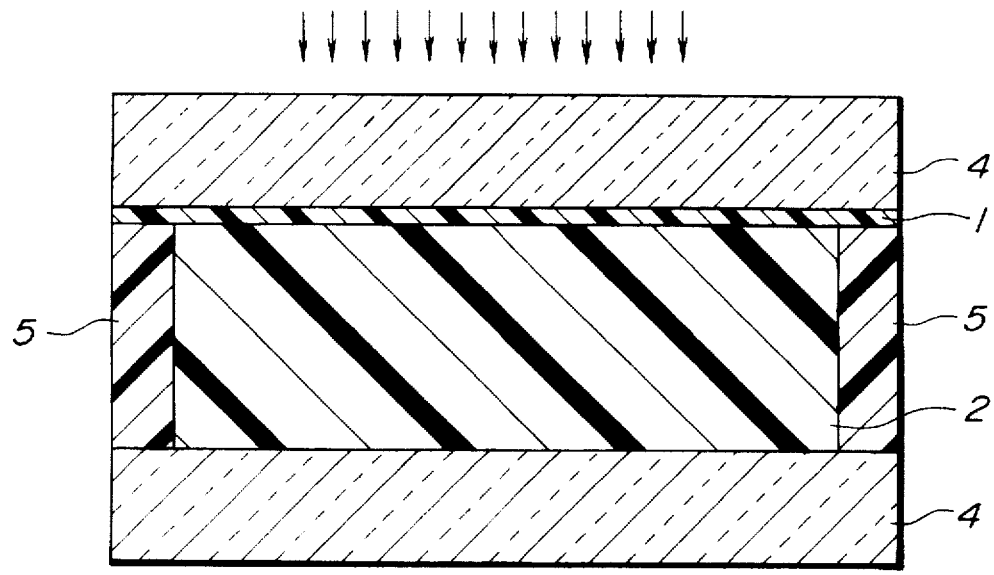
FIG. 4 is a cross-sectional view showing a mold used for the preferred embodiments of the present invention.

100 parts by weight of p-bis(β-methacryloyl-oxy-ethylthio)xylylene, 0.1 part by weight of 2,4,6-trimethylbenzoyldiphenyl-phosphine oxide as a photo-polymerization initiator and 0.02 part by weight of benzophenone were intimately mixed with each other while stirring to form a homogeneous photo-curable monomer composition. The obtained composition was poured into a mold, as shown in FIG. 4, comprising a pair of transparent glass plates 4 each having a thickness of 1 mm, silicone spacers 5 having a thickness of 2 mm and interposed between the glass plates 4 so as to form the desired cavity, and a negative-type chromium-deposition mask 1 having a plurality of light-transmitting portions each having a diameter of 1 mm and spaced from each other at intervals of 2 mm as shown in FIG. 1, wherein the negative-type chromium-deposition mask 1 had been formed on the surface of the irradiated-side glass plate such that the negative-type chromium-deposition mask 1 had been faced to the poured photo-curable monomer composition. By using a high-pressure discharge lamp having an output power of 30 W/cm, ultraviolet scattered light having an intensity of irradiation of 8 mW/cm² was irradiated for 10 seconds from above to the photo-curable monomer composition 2 through the upper glass plate 4 and the negative-type mask 1. Next, ultraviolet scattered light having an intensity of irradiation of 16 mW/cm² was irradiated for 3 minutes from both top and bottom to cure the photo-curable monomer composition 2. After removal from the mold, the resulting cured product was annealed at 100° C. for one hour so that the aimed convex microlens array 3a arranged on one surface of the cured product as shown in FIG. 1 was obtained. It was confirmed that individual convex microlens portions had a diameter of 1 mm, a projecting height of 21 μm and a focal distance of +10 cm. The light transmittances of the thus-prepared optical device are shown in Table 1.

Example 2

Concave microlens array was produced by the same manner as described in Example 1, except that the positive-type mask 1b as shown in FIG. 2 on which a plurality of light-shielding portions each having a diameter of 1 mm were formed at intervals of 2 mm, was used. As a result, the aimed concave microlens array 3b arranged on one surface of the cured product as shown in FIG. 2 was obtained. It was confirmed that individual concave microlens portions had a diameter of 1 mm, a depth of 35 μm and a focal distance of −5 cm. The light transmittances of the thus-prepared optical device are also shown in Table 1.

Example 3

Concave microlens array was produced by the same manner as described in Example 2, except that the silicone spacer having a thickness of 1 mm was used. As a result, the aimed concave microlens array arranged on one surface of the cured product was obtained. It was confirmed that individual concave microlens portions had a diameter of 1 mm, a depth of 21 μm and a focal distance of −10 cm. The light transmittances of the thus-prepared optical device are also shown in Table 1.

Comparative Example 1

A mixture composed of 25 parts by weight of polymethylmethacrylate, 75 parts by weight of methyl methacrylate and 0.25 part by weight of 1-hydroxy-cyclohexyl-phenyl ketone as a photo-polymerization initiator was heated and melted at 70° C. to form a resin composition. The resin composition was poured into the mold used in Example 1. By using a high-pressure discharge lamp having an output power of 30 W/cm, ultraviolet scattered light having an intensity of irradiation of 8 mW/cm² was irradiated on the resin composition through the negative-type mask for 12 minutes.

Next, by using the high-pressure discharge lamp having an output power of 30 W/cm, ultraviolet parallel light having an intensity of irradiation of 8 mW/cm² was irradiated for 24 minutes through a collimator lens from the back side of the mold where no mask was disposed, to cure the resin composition.

The resulting cured product removed from the mold was found to be translucent both at lens-forming portions on which the scattered light is irradiated and at non-lens-forming portions where the polymerization of the resin composition was carried out by irradiation of the parallel light beam only. The light transmittances measured were also shown in Table 1.

Comparative Example 2

A mixture composed of 25 parts by weight of polymethylmethacrylate, 75 parts by weight of methyl methacrylate and 0.25 part by weight of 1-hydroxy-cyclohexyl-phenyl ketone as a photo-curable initiator was heated and melted at 70° C. to form a resin composition. The resin composition was poured into the mold used in Example 2. By using a high-pressure discharge lamp having an output power of 30 W/cm, ultraviolet scattered light having an intensity of irradiation of 8 mW/cm² was irradiated on the resin composition through the positive-type mask for 12 minutes.

Next, by using the high-pressure discharge lamp having an output power of 30 W/cm, ultraviolet parallel light having an intensity of irradiation of 8 mW/cm² was irradiated for 24 minutes through a collimator lens from the back side of the mold where no mask was disposed, to cure the resin composition.

The resulting cured product removed from the mold was found to be translucent both at lens-forming portions and non-lens-forming portions. The light transmittances measured are also shown in Table 1.

TABLE 1

| | | Light transmittance (%) | | |
|---|---|---|---|---|
| | | 450 nm | 550 nm | 650 nm |
| Example 1 | Lens portion | 90 | 90 | 90 |
| | Non-lens portion | 90 | 90 | 90 |
| Example 2 | Lens portion | 90 | 90 | 90 |
| | Non-lens portion | 90 | 90 | 90 |
| Example 3 | Lens portion | 90 | 90 | 90 |
| | Non-lens portion | 90 | 90 | 90 |
| Comparative Example 1 | Lens portion | 55 | 55 | 55 |
| | Non-lens portion | 51 | 51 | 51 |
| Comparative Example 2 | Lens portion | 55 | 55 | 55 |
| | Non-lens portion | 51 | 51 | 51 |

Example 4

Figure 5:
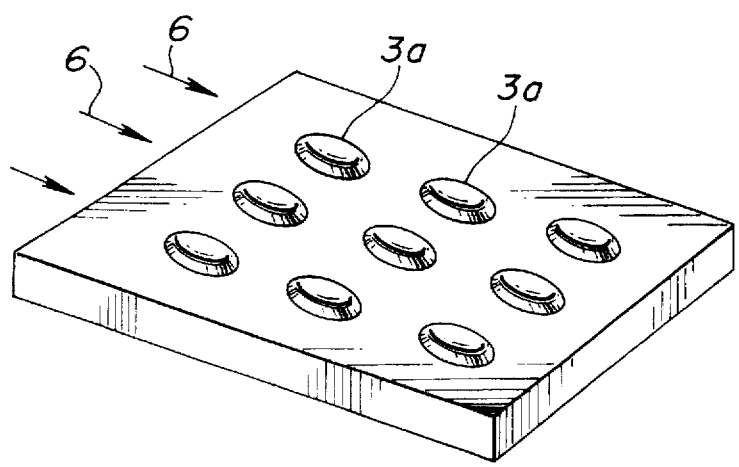
FIG. 5 is a perspective view showing a microlens array-device prepared in Example 4.
Figure 6:
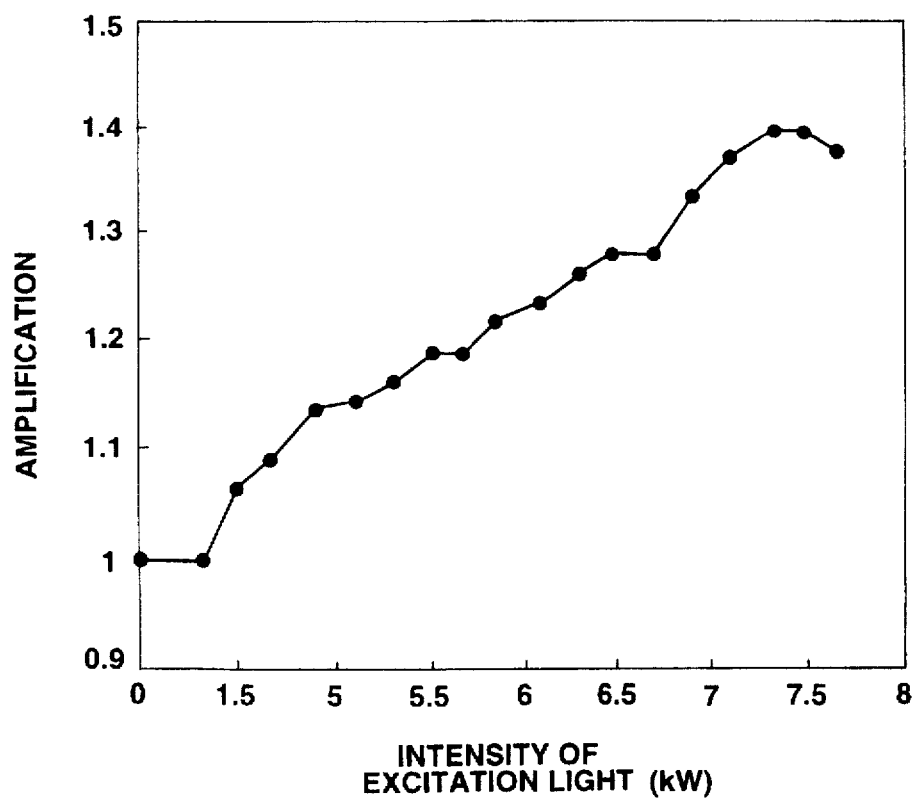
FIG. 6 is a graph showing the evaluation results of optical properties of the lens device produced in Example 4.

Convex microlens array was produced by the same manner as described in Example 1, except that 0.1 part by weight of rhodamine B was further added to the photo-curable monomer composition. As a result, a convex microlens array as shown in FIG. 5 was obtained. It was confirmed that individual convex microlens portions had a diameter of 1 mm, a projecting height of 21 μm and a focal distance of +10 cm. Further, an optical amplification was measured using the obtained convex microlens array. At this time, a light beam having a wavelength of 591 nm from above and an excitation light beam 6 having a wavelength of 530 nm were simultaneously incident on individual convex microlens portions 3a. The intensity of emitted light having a wavelength of 591 nm was measured as an output power of the excitation light was increased from 0 kW to 8 kW. The results are shown in FIG. 6.

What is claimed is:

1. An optical device comprising a plurality of microlenses, each having a light transmittance of not less than 80% when measured with a light beam having a wavelength within a visible light range, and produced by subjecting a photocurable monomer composition to two-stage light irradiation comprising a partial irradiation and a whole irradiation.

2. The optical device according to claim 1, wherein said photo-curable monomer composition has a shrinkage when cured.

3. The optical device according to claim 1, wherein said photo-curable monomer composition contains a multi-functional acrylate or methacrylate compound.

4. The optical device according to claim 3, wherein said multi-functional acrylate or methacrylate compound is a sulfur-containing multi-functional acrylate or methacrylate compound.

5. The optical device according to claim 1, wherein said optical device is a microlens array.

6. The optical device according to claim 5, wherein said microlens array is a convex microlens array.

7. The optical device according to claim 1, wherein said photo-curable monomer composition contains a fluorescent dye.

8. An optical device according to claim 1, wherein said optical device is part of a color filter.

9. An optical device comprising a plurality of microlenses within a non-microlens portion that is made of a resin, wherein each of microlenses are made of a resin and have a light transmittance of not less than 80% when measured with a light beam having a wavelength within a visible light range.

10. The optical device according to claim 9, wherein the non-microlens portion has a light transmittance of not less than 80% when measured with a light beam having a wavelength within a visible light range.

11. The optical device according to claim 3, wherein said multi-functional acrylate or methacrylate compound is selected to provide a polymer having a refractive index of not less than 1.50.

12. The optical device according to claim 3, wherein said multi-functional acrylate or methacrylate compound is at least one compound selected from the group consisting of triethylene glycol-diacrylate, triethylene glycol-dimethacrylate, hexane diol-diacrylate, hexane diol-dimethacrylate, 2,2-bis(4-acryloyl-oxy-phenyl)propane, 2,2-bis(4-methacryloyl-oxy-phenyl)propane, 2,2-bis[4-(2-acryloyl-oxy-ethoxy)phenyl]propane, 2,2-bis[4-(2-methacryloyl-oxy-ethoxy)phenyl]propane, p-bis(β-acryloyl-oxy-ethylthio)xylylene, p-bis(β-methacryloyl-oxy-ethylthio)xylylene, 4,4'-bis(β-acryloyl-oxy-ethylthio) diphenyl sulfone, 4,4'-bis(β-methacryloyl-oxy-ethylthio) diphenyl sulfone, trimethylol propane-triacrylate, trimethylol propane-trimethacrylate, urethane-acrylate, epoxy-acrylate, a mixture of at least one of these compounds and a monofunctional monomer copolymerizable therewith, or a mixture of at least one of these compounds and a polythiol capable of addition-polymerization therewith.

13. The optical device according to claim 7, wherein said fluorescent dye is contained in an amount of 0.01 to 10,000 ppm based on the weight of the photo-curable monomer composition.

14. A process for producing an optical device comprising microlenses, which comprises pouring a photo-curable monomer composition into a mold and subjecting the photo-curable monomer composition to two-stage light irradiation comprising a partial irradiation and a whole irradiation to form microlenses, each having a light transmittance of not less than 80% when measured with a light beam having a wavelength within a visible light range.

15. The process according to claim 14, wherein said photo-curable monomer composition has a shrinkage when cured.

16. The process according to claim 15, wherein said photo-curable monomer composition a multi-functional acrylate or methacrylate compound.

17. The process according to claim 14, wherein said multi-functional acrylate or methacrylate compound is a sulfur-containing multi-functional acrylate or methacrylate compound.

18. The process according to claim 14, wherein the time of an entire irradiation steps from the partial irradiation to the whole irradiation is not more than 20 minutes.

19. The process according to claim 14, wherein said photo-curable monomer composition contains a fluorescent dye.

* * * * *